United States Patent [19]
Nagai et al.

[11] Patent Number: 5,597,054
[45] Date of Patent: *Jan. 28, 1997

[54] HYDRAULIC DAMPER

[75] Inventors: Osamu Nagai, Sizuoka; Kunihide Okamoto, Shizuoka; Kaoru Yamamoto, Kanagawa, all of Japan

[73] Assignee: Showa Corporation, Japan

[*] Notice: The term of this patent shall not extend beyond the expiration date of Pat. No. 5,480,011.

[21] Appl. No.: 515,537

[22] Filed: Aug. 16, 1995

Related U.S. Application Data

[62] Division of Ser. No. 128,987, Sep. 29, 1993, Pat. No. 5,480,011.

[30] Foreign Application Priority Data

Sep. 29, 1992 [JP] Japan ................................. 4-73582
Sep. 29, 1992 [JP] Japan ................................. 4-73583

[51] Int. Cl.⁶ .................................................... F16F 9/46
[52] U.S. Cl. ........................ 188/299; 188/318; 188/315
[58] Field of Search ........................... 188/298, 299, 188/315; 267/64.16, 64.18, 64.19, 64.23, 64.27, 221; 280/707, 708, 714

[56] References Cited

U.S. PATENT DOCUMENTS

| | | | |
|---|---|---|---|
| 3,559,776 | 2/1971 | Schultze | 188/299 |
| 3,848,710 | 11/1974 | Thompson et al. | 188/280 |
| 4,036,335 | 7/1977 | Thompson et al. | 188/319 |
| 4,305,486 | 12/1981 | Cowan | 188/299 |
| 4,313,529 | 2/1982 | Kato et al. | 188/319 |
| 4,666,180 | 5/1987 | Shirakuma | 188/299 |
| 4,813,519 | 3/1989 | Matsuhara et al. | 188/299 |
| 4,936,423 | 6/1990 | Karnopp | 188/299 |
| 5,351,790 | 10/1994 | Machida | 188/299 |
| 5,480,011 | 1/1996 | Nagai et al. | 188/299 |

FOREIGN PATENT DOCUMENTS

| | | | |
|---|---|---|---|
| 3819839A1 | 12/1988 | Germany . | |
| 3922155A1 | 1/1991 | Germany . | |
| 53-26550 | 7/1978 | Japan . | |
| 60-24688 | 2/1985 | Japan . | |
| 3-5222 | 1/1991 | Japan . | |
| 0005222 | 1/1991 | Japan | 188/299 |
| 4-372410 | 12/1992 | Japan | 188/299 |

Primary Examiner—Robert J. Oberleitner
Assistant Examiner—Chris Schwartz
Attorney, Agent, or Firm—Merchant, Gould, Smith, Edell, Welter & Schmidt

[57] ABSTRACT

A hydraulic damper has a first oil chamber, a second oil chamber, a communication mechanism defining a communication oil passage, the first and second oil chambers communicating with each other through the communication oil passage, and a damping force adjusting mechanism for varying a cross-sectional area of the communication oil passage to adjust damping forces. The damping force adjusting mechanism includes an adjusting rod having an end disposed in a portion of the communication oil passage, the adjusting rod being movable toward and away from the communication oil passage to vary the cross-sectional area of the communication oil passage, an eccentric cam rotatably disposed in engagement with an opposite end of the adjusting rod, and a rotary actuator for rotating the eccentric cam to move the adjusting rod toward and away from the communication oil passage to adjust the damping forces.

6 Claims, 7 Drawing Sheets

HYDRAULIC DAMPER

This is a divisional of application Ser. No. 08/128,987, filed Sep. 29, 1993 now U.S. Pat. No. 5,480,011, which application are incorporated herein by reference.

BACKGROUND OF THE INVENTION

1. Field of the Invention

The present invention relates to a hydraulic damper for use on a motor vehicle or the like, and more particularly to a damping force adjusting mechanism for such a hydraulic damper.

2. Description of the Prior Art

Japanese utility model publication No. 53-26550 discloses a hydraulic damper for use on a motor vehicle. The disclosed hydraulic damper has a cylinder, a hollow rod extending into the cylinder, and a piston fixed to the inner end of the hollow rod and held in sliding contact with an inner surface of the cylinder. The piston has an oil passage for generating damping forces and a valve for selectively opening and closing the oil passage. A bypass oil passage is defined to bypass the piston through the hollow passage, and an adjusting rod is axially movably inserted in the hollow rod and disposed in the bypass oil passage. When the adjusting rod is axially moved in the hollow rod, the cross-sectional area of the bypass oil passage is varied to adjust the damping forces produced by the hydraulic damper.

The disclosed damping force adjusting mechanism cannot instantaneously adjust the damping forces in response to any of various sensor signals because an eccentric cam for axially moving the adjusting rod is manually turned.

Another known hydraulic damper disclosed in Japanese laid-open utility model publication No. 60-24688 is similar to the hydraulic damper disclosed in Japanese utility model publication No. 53-26550 except that a conical adjusting screw is used instead of the eccentric cam, and the adjusting rod is axially movable by an actuator through the adjusting screw. The adjusting rod has one end facing into an oil chamber in the cylinder which is pressurized by a gas under pressure. The adjusting rod is thus subject to a force applied by the gas under pressure and tending to axially move the adjusting screw to a position in which the generated damping forces are smallest. When the motor of the actuator or a control system for controlling-the actuator fails and the actuator is into a free condition, the adjusting screw is axially moved into the position in which the damping forces are smallest, with the result that the damping forces become inappropriate. The damping forces also become inappropriate when an error signal is applied to the actuator due to a failure of the control system.

SUMMARY OF THE INVENTION

It is therefore an object of the present invention to provide a hydraulic damper which is capable of adjusting damping forces smoothly and accurately and producing stable damping forces at all times.

According to the present invention, there is provided a hydraulic damper comprising a first oil chamber, a second oil chamber, a communication mechanism defining a communication oil passage, the first and second oil chambers communicating with each other through the communication oil passage, and a damping force adjusting mechanism for varying a cross-sectional area of the communication oil passage to adjust damping forces, the damping force adjusting mechanism comprising an adjusting rod having an end disposed in a portion of the communication oil passage, the adjusting rod being movable toward and away from the communication oil passage to vary the cross-sectional area of the communication oil passage, an eccentric cam rotatably disposed in engagement with an opposite end of the adjusting rod, and a rotary actuator for rotating the eccentric cam to move the adjusting rod toward and away from the communication oil passage to adjust the damping forces.

The eccentric cam may comprise a constant-velocity cam with a change in its eccentricity per unit angle of rotation thereof being constant.

Since the eccentric cam is rotated by the rotary actuator to move the adjusting rod, the damping forces can be adjusted easily. The eccentric cam which comprises a constant-velocity cam allows the adjusting rod to move a constant distance upon rotation of the rotary actuator per unit angle. Therefore, the damping forces can be adjusted smoothly, precisely, and simply.

The damping force adjusting mechanism may further comprise a control system for controlling the rotary actuator, and limiting means for limiting rotation of the eccentric cam upon failure of at least one of the rotary actuator and the control system. Even in the event of a failure of the rotary actuator or the control system, allowing the rotary actuator to be brought into a free condition, the eccentric cam is limited by the limiting means to stop at a predetermined position. Thus, no inappropriate damping forces are generated by the damper assembly. If the maximum angular displacement of the eccentric cam is limited by the limiting means, then even when an error signal is outputted from the control system to the rotary actuator, the eccentric cam is prevented from being rotated beyond a maximum angular position in response to the error signal. If the limiting means is arranged to stop the eccentric cam at a position for optimum damping forces, then the eccentric cam is stopped at the position for optimum damping forces even upon failure of the control system or the rotary actuator.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
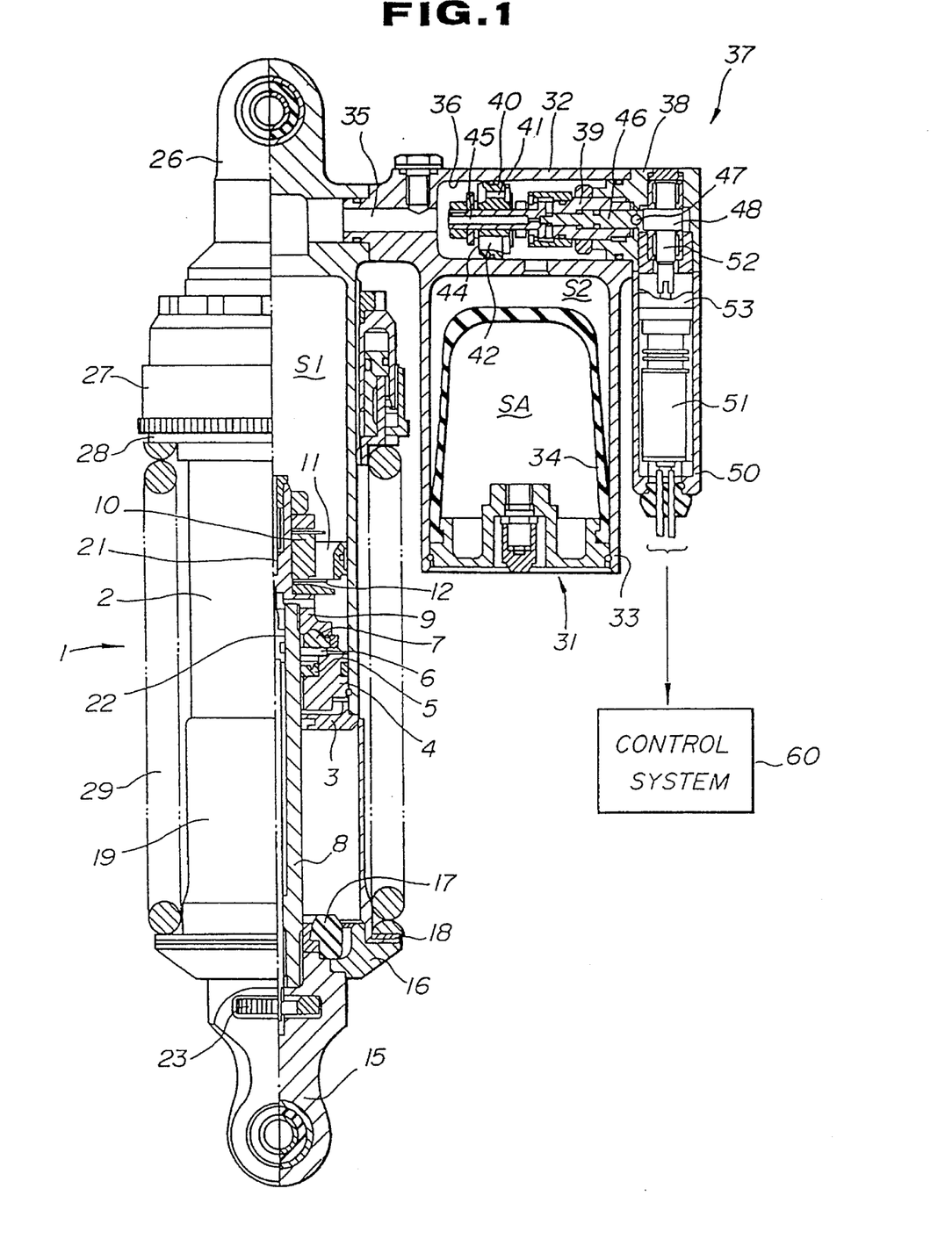
FIG. 1 is a fragmentary cross-sectional view of a hydraulic damper according to a first embodiment of the present invention.

As shown in FIG. 1, a hydraulic damper according to a first embodiment of the present invention has a damper assembly 1 including a cylinder 2 with a lower cap 3 mounted on a lower end thereof. The cylinder 2 houses a rod guide 4, an oil seal 5, a retainer 6, and a rubber rebound member 7 which are successively arranged in the axial direction and through which a hollow rod 8 extends into the cylinder 2. The hollow rod 8 supports a rod end 9 threaded over its inner (upper) end and on which a piston 10 is mounted in sliding contact with an inner surface of the cylinder 2. The piston 10 has an oil passage 11 defined therein for allowing working oil to flow therethrough when the damper assembly 1 is compressed, and openably closed by a valve 12 mounted on the piston 10. Similarly, the piston 10 also has an oil passage (not shown) defined therein for allowing working oil to flow therethrough when the damper assembly 1 is extended, and openably closed by a valve (not shown) mounted on the piston 10.

An axle attachment 15 for being coupled to a wheel axle (not shown) is mounted on the outer (lower) end of the hollow rod 8. The axle attachment 15 supports on its upper end an annular spring seat stopper 16 with an annular rubber stopper 17 disposed on its inner peripheral edge. The axle attachment 15 supports on its outer peripheral edge a ring-shaped spring seat 18 including a cylindrical spring guide 19 extending from its inner peripheral edge upwardly toward the cylinder 2.

The rod end 9 has a bypass oil passage 21 defined therein in bypassing relationship to the oil passage 11 in the piston 10. The cross-sectional area of the bypass oil passage 21 can be adjusted by the upper end of a needle rod 22 that is axially movably inserted in the hollow rod 8. The needle rod 22 can be axially moved by an adjuster 23 rotatably mounted in the axle attachment 15 and coupled to the lower end of the needle rod 22.

A vehicle body attachment 26 for being coupled to a vehicle body (not shown) is integrally formed with the upper end of the cylinder 2. A jack cylinder 27 is fitted over an upper portion of the cylinder 2. A suspension spring 29 in the form of a compression coil spring is disposed around the cylinder 2 and the cylindrical spring guide 19 and extends axially between the spring seat 18 and a jack piston 28 slidably fitted in the jack cylinder 27.

An auxiliary tank 31 is attached to one side of the upper end of the cylinder 2. The auxiliary tank 31 comprises a tank attachment 32 joined to the cylinder 2, a casing 33 integral with and extending downwardly from the tank attachment 32, and a bladder 34 housed in the casing 33, with a gas being sealed under pressure in the bladder 34. The tank attachment 32 has a communication passage 35 defined therein for providing fluid communication between an oil chamber S1 in the cylinder 2 and an oil chamber S2 in the casing 33, and a cylindrical recess 36 defined therein and joined to the communication passage 35. A damping force adjusting mechanism 37 has its major parts housed in the recess 36.

Figure 2:
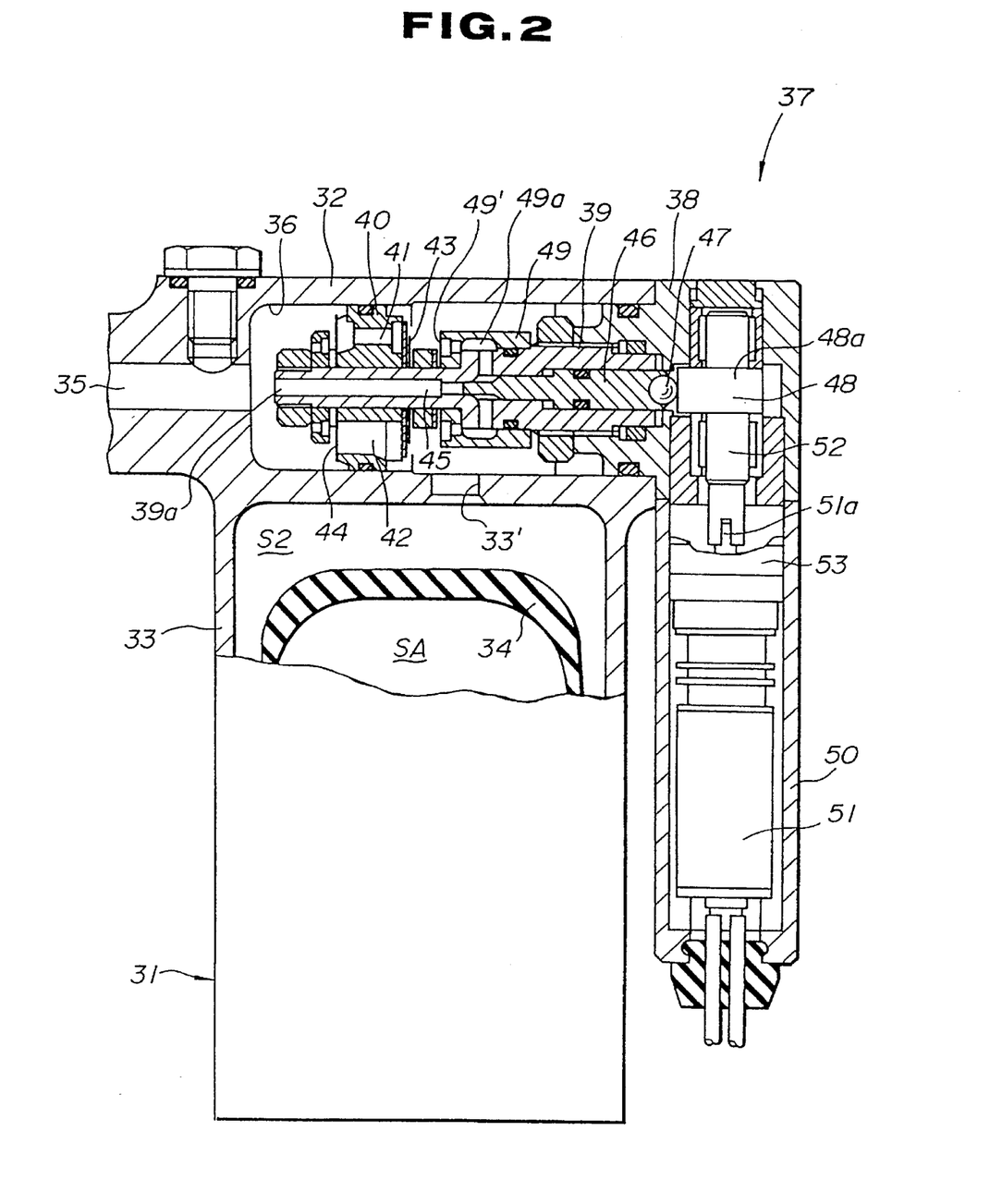
FIG. 2 is an enlarged fragmentary cross-sectional view of a damping force adjusting mechanism and associated components of the hydraulic damper shown in FIG. 1.

As shown in FIG. 2, the damping force adjusting mechanism 37 comprises a housing 38 mounted on an open end of the tank attachment 32 which communicates with the recess 36, a valve case 39 threaded in the housing 38 and disposed in the recess 36, a piston 40 fixed to the distal end of the valve case 39 remote from the housing 38, the piston 40 having oil passages 41, 42 defined axially therethrough, and a pair of valves 43, 44 mounted on the piston 40 for opening and closing the oil passages 41, 42. The valve case 39 has an oil passage 39a defined centrally therethrough in bypassing relationship to the oil passages 41, 42. The valve case 39 includes a larger-diameter portion over which a valve seat 49 is fitted. The valve seat 49 has an oil passage 49a defined therein in communication with the oil passage 39a. An auxiliary valve 491 is mounted on the valve seat 49 over an open end of the oil passage 49a. The oil passages 39a, 49a jointly serve as a bypass oil passage 45 which can provide fluid communication between the oil chambers S1, S2 through an opening 331 defined in an upper wall of the casing 33.

An adjusting rod 46 is axially movably inserted in the valve case 39 and has a front end (shown as a left end) disposed in a portion of the bypass oil passage 45. The damping force adjusting mechanism 37 includes a ball 47 rotatably held against the rear end of the adjusting rod 46. The communication passage 35, the recess 36, and the bypass oil passage 45 jointly serve as a communication mechanism that defines a communication passage through which the oil chambers S1, S2 communicate with each other.

Figure 4:
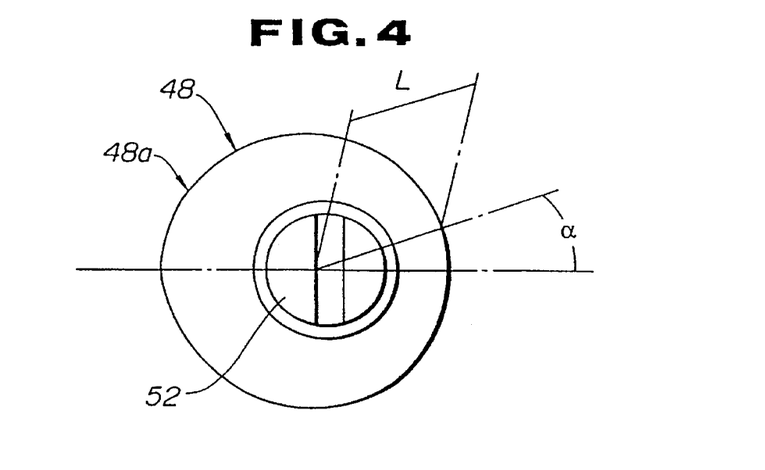
FIG. 4 is an end view of the eccentric cam member as viewed in the direction indicated by the arrow IV in FIG. 3.

An eccentric cam 48 is rotatably disposed in the housing 38 and has a cam surface 48a held in rolling engagement with the ball 47 rotatably held against the rear end of the adjusting rod 46. The eccentric cam 48 is a constant-velocity cam in which its eccentricity per unit angle of rotation thereof or a change in its eccentricity per unit angle of rotation thereof is made constant by selecting the distance L (see FIG. 4) from the center of rotation to the cam surface 48a with respect to an angle a as indicated by the following table:

| α | 0° | 10° | 20° | 30° | 40° |
|---|---|---|---|---|---|
| L | 5.00 | 5.11 | 5.22 | 5.33 | 5.44 |
| α | 50° | 60° | 70° | 80° | 90° |
| L | 5.56 | 5.67 | 5.78 | 5.89 | 6.00 |
| α | 100° | 110° | 120° | 130° | 140° |
| L | 6.11 | 6.22 | 6.33 | 6.44 | 6.56 |
| α | 150° | 160° | 170° | 180° | — |
| L | 6.67 | 6.78 | 6.89 | 7.00 | — |

(unit of the distance L: mm)

Figure 3:
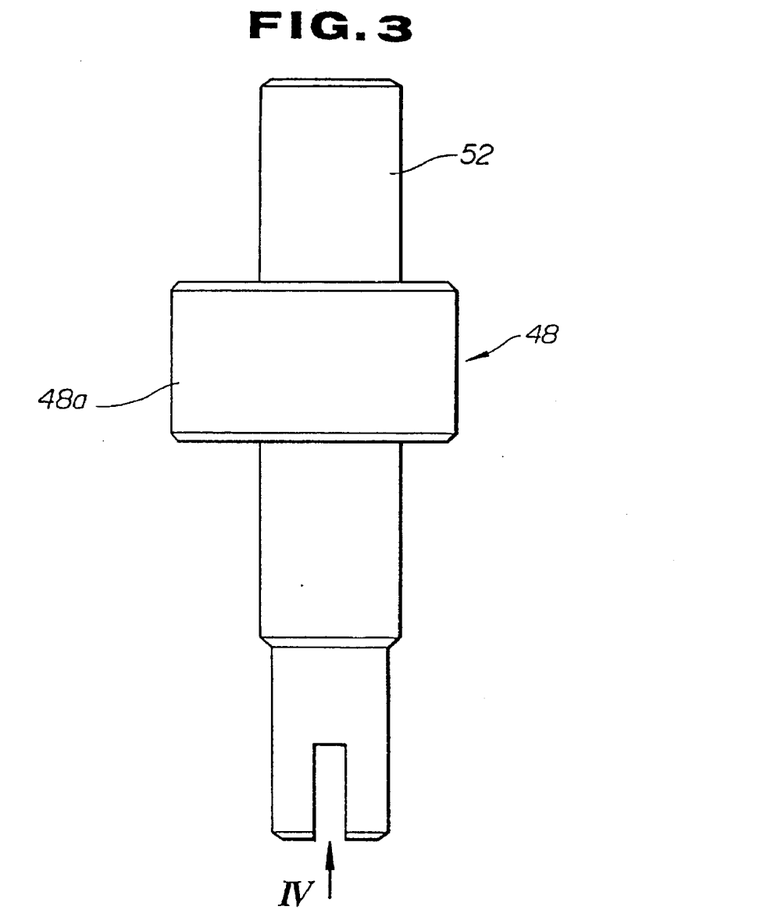
FIG. 3 is an enlarged front elevational view of an eccentric cam member of the damping force adjusting mechanism shown in FIG. 2.

As shown in FIG. 2, an actuator case 50 is attached to the housing 38 and houses a rotary actuator 51 such as an electric motor for rotating the eccentric cam 48. The rotary actuator 51 has a rotatable shaft 51a coupled to a shaft 52 (see also FIG. 3) of the eccentric cam 48. The actuator case 50 also houses a potentiometer 53 for detecting the angular displacement of the eccentric cam 48, i.e., the rotary actuator 51. The rotary actuator 53 is controlled in its operation by a control system 60 (see FIG. 1). As shown in FIG. 1, the damper assembly 1, the auxiliary tank 31, and the rotary actuator have their respective axes lying parallel to each other, making the hydraulic damper compact.

When the hollow rod 8 is lifted in a compression stroke of the damper assembly 1, a volume of working oil that is displaced by the hollow rod 8 or the piston 10 as it moves into the cylinder 2 flows from the oil chamber S1 into the communication passage 35. The working oil then flows through the oil passage 41, pushing open the valve 43, and enters the oil chamber S2 through the opening 331, for thereby producing damping forces. The working oil also flows through the bypass oil passage 45 in the valve case 39 and the valve seat 49 and also the opening 331 into the oil chamber S2.

When the rotary actuator 51 is energized, the eccentric cam 48 is rotated to axially move the adjusting rod 46 for thereby acting on the working oil flowing through the bypass oil passage 45, i.e., varying the cross-sectional area of the bypass oil passage 45. Therefore, the damping forces generated by the piston 40 can be adjusted by the adjusting rod 46.

The eccentric cam or constant-velocity cam 48 which axially moves the adjusting rod 46 produces small frictional forces and hence can be rotated sufficiently by the rotary actuator 51 which ma be of small size. Consequently, the damping force adjusting mechanism 37 may be relatively compact.

When the hollow rod 8 is lowered in an extension stroke of the damper assembly 1, a volume of working oil is drawn by the hollow rod 8 or the piston 10 as it is retracted out of the cylinder 2 into the oil chamber S1 from the oil chamber S2 through the oil passage 42, the valve 44 as it is pushed open, and the communication passage 35. In the extension stroke, the bypass oil passage 45 is closed by the auxiliary valve 491 as shown in FIG. 2.

The first embodiment, since the eccentric cam 48 is rotated by the rotary actuator 51 to axially move the adjusting rod 46, the damping forces produced by the piston 40 can easily be adjusted. The actuator mechanism including the actuator case 50 and the rotary actuator 51 may be small in size. The hydraulic damper is relatively compact as the damper assembly 1, the auxiliary tank 31, and the rotary actuator 51 have their respective axes extending parallel to each other. The process of adjusting the damping forces is facilitated because the actuator 51 employed is a rotary actuator for rotating the eccentric cam 48 to axially move the adjusting rod 46. Inasmuch as the eccentric cam 48 comprises a constant-velocity cam, it produces small frictional forces in contact with the adjusting rod 46, allowing the adjusting rod 46 to axially move smoothly and precisely. Furthermore, the damping force adjustment is easy and simple to perform and can be achieved by a small-size actuator because the adjusting rod 46 is axially moved a constant distance by rotation per unit angle of the rotary actuator 51.

A hydraulic damper according to a second embodiment of the present invention will be described below with reference to FIGS. 5 through 9.

Figure 5:
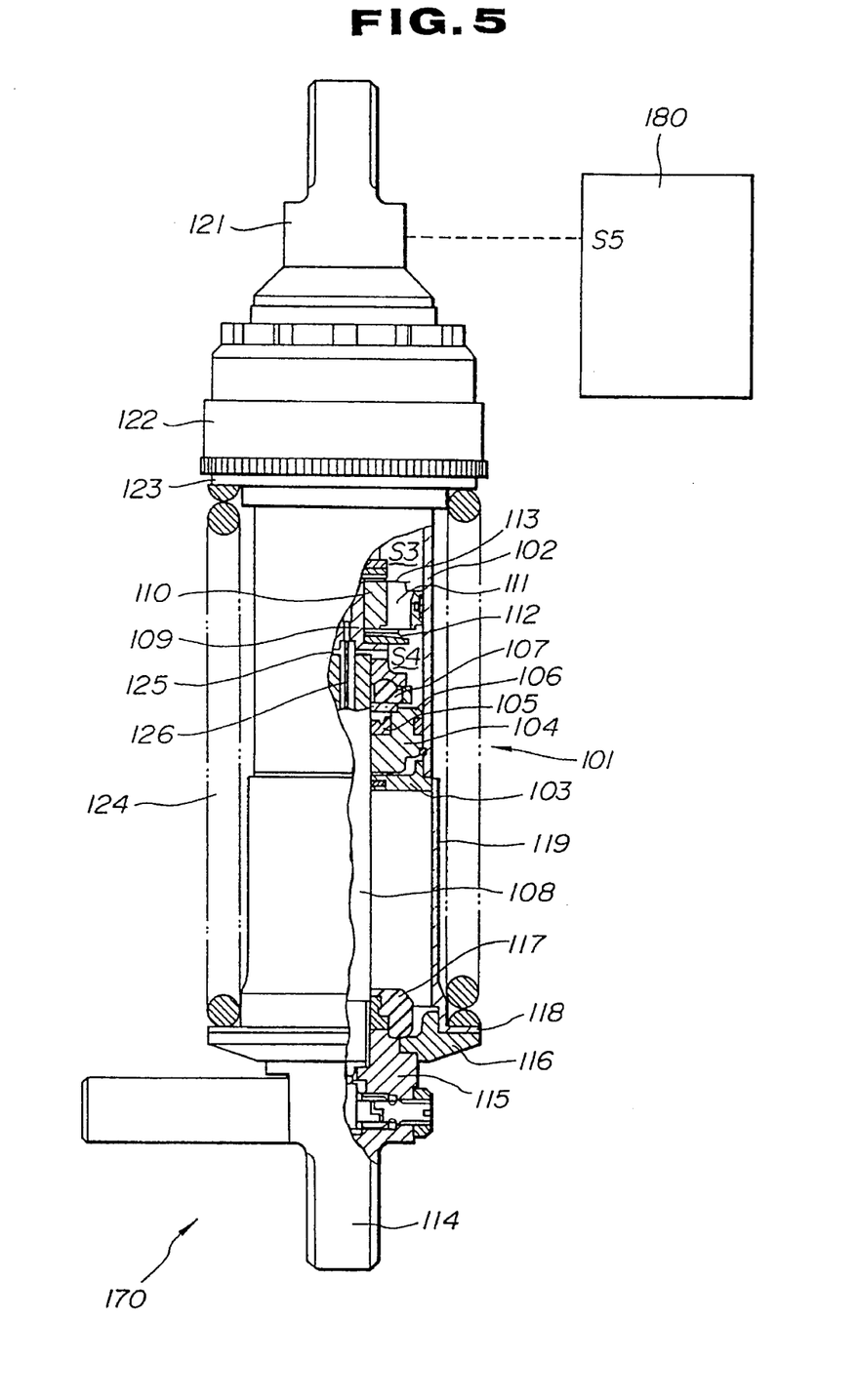
FIG. 5 is ci fragmentary cross-sectional view of a hydraulic damper according to a second embodiment of the present invention.

As shown in FIG. 5, the hydraulic damper has a damper assembly 101 including a cylinder 102 with a lower cap 103 mounted on a lower end thereof. The cylinder 102 houses a rod guide 104, an oil seal 105, a retainer 106, and a rubber rebound member 107 which are successively arranged in the axial direction and through which a hollow rod 108 extends into the cylinder 102. The hollow rod 108 supports a rod end 109 threaded over its inner (upper) end and on which a piston 110 is mounted in sliding contact with an inner surface of the cylinder 102. The rod end 109 and the piston 110 jointly constitute a piston assembly. The piston 110 divides the interior space in the cylinder 102 into an upper oil chamber S3 and a lower oil chamber S4. The piston 110 has an oil passage 111 defined therein for generating damping forces and another oil passage (not shown) defined therein. A valve 112 for opening and closing the oil passage 111 and a valve 113 for opening and closing the non-illustrated oil passage are mounted on the piston 110.

The upper oil chamber S3 communicates with an oil chamber S5 in an auxiliary tank 180. The auxiliary tank 180 has a gas chamber defined therein by a flexible partition with a gas sealed under pressure in the gas chamber.

A housing 115 integrally formed with an axle attachment 114 for being mounted on a wheel axle (not shown) is mounted on the lower (outer) end of the hollow rod 108. The housing 115 supports on its upper end an annular spring seat stopper 116 with an annular rubber stopper 117 disposed on its inner peripheral edge. The housing 115 supports on its outer peripheral edge a ring-shaped spring seat 118 including a cylindrical spring guide 119 extending from its inner peripheral edge upwardly toward the cylinder 102.

A vehicle body attachment 121 for being coupled to vehicle body (not shown) is mounted on the upper end of the cylinder 102. A jack cylinder 122 is fitted over an upper portion of the cylinder 102. A suspension spring 124 in the form of a compression coil spring is disposed around the cylinder 102 and the cylindrical spring guide 119 and extends axially between the spring seat 118 and a jack piston 123 slidably fitted in the jack cylinder 122.

Figure 6:
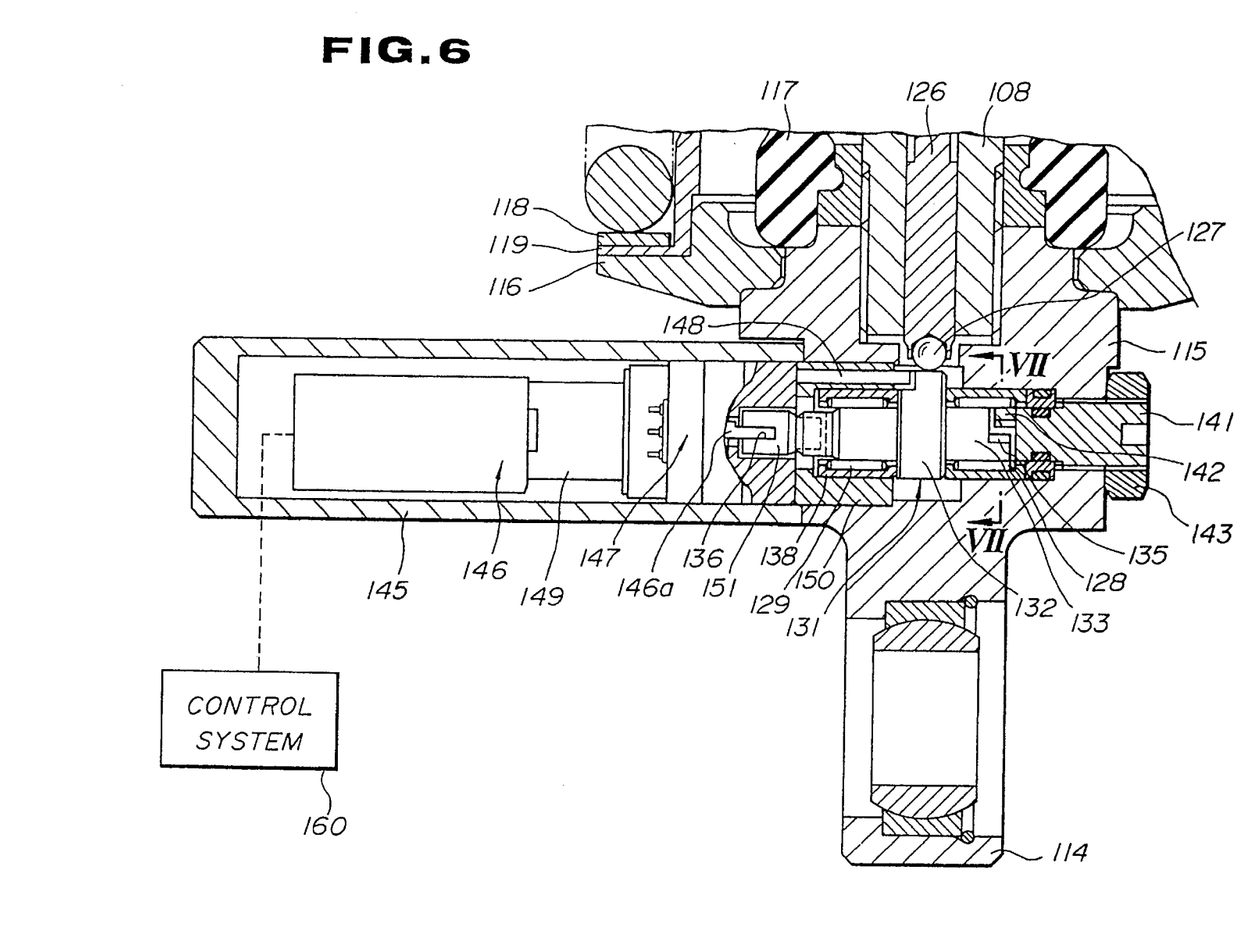
FIG. 6 is an enlarged fragmentary cross-sectional view of a damping force adjusting mechanism and associated components of the hydraulic damper shown in FIG. 5.

The rod end 109 has a bypass oil passage 125 defined therein in bypassing relationship to the oil passage 111 in the piston 110. The cross-sectional area of the bypass oil passage 125 can be adjusted by the upper end of an adjusting rod or needle valve 1.26 that is axially movably inserted in the hollow rod 108. As shown in FIG. 6, a ball 127 is rotatably held against-the lower end of the adjusting rod 126. In the second embodiment, at least the bypass oil passage 125 serves as a communication mechanism that defines a communication passage through which the oil chambers S4, S5 communicate with each other via the oil chamber S3.

Figure 7:
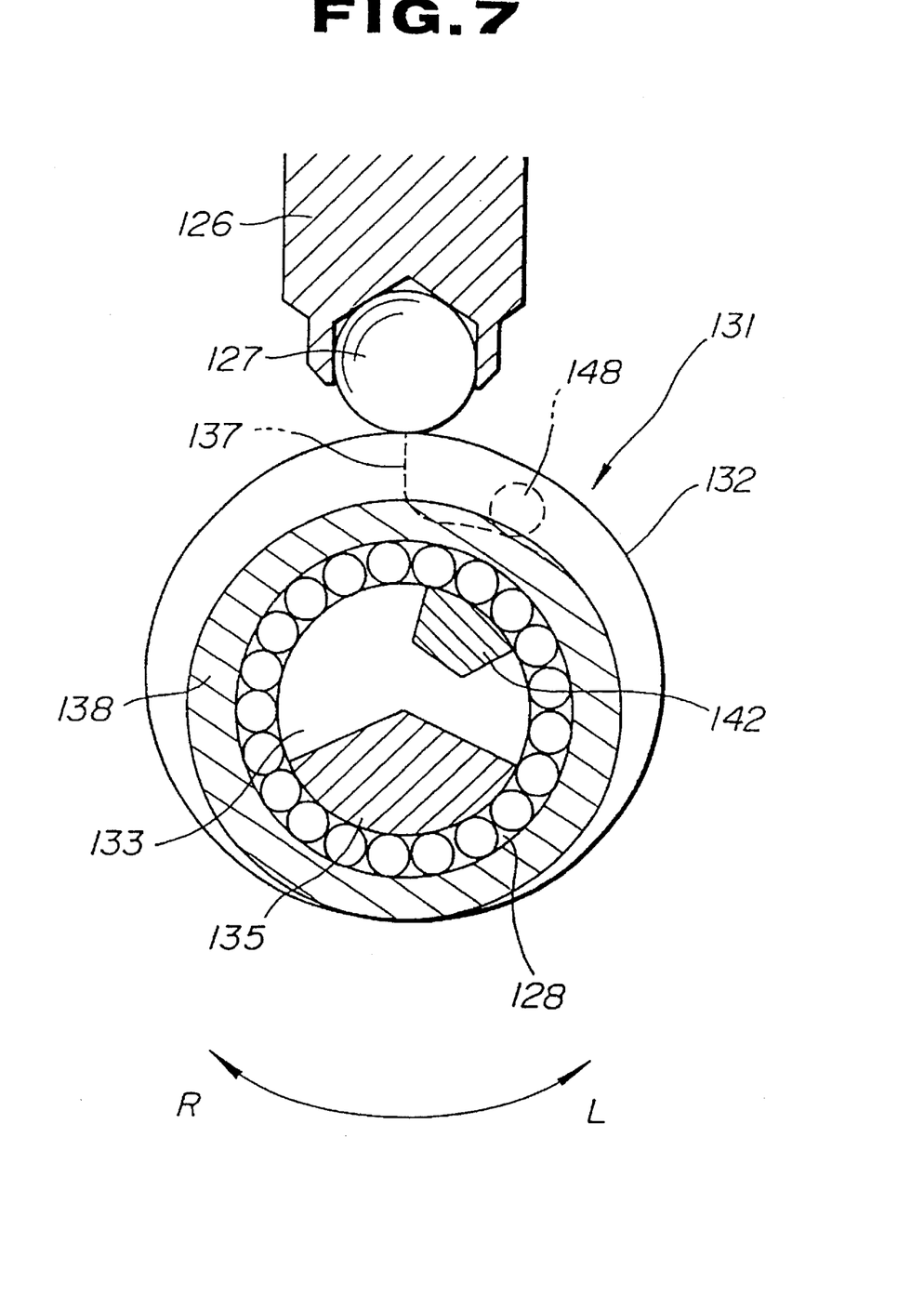
FIG. 7 is a cross-sectional view taken along line VII—VII of FIG. 6.

As shown in FIG. 6, a damping force adjusting mechanism 170 includes a needle housing 138 disposed in the housing 115, and an eccentric cam 131 in the form of a constantvelocity cam 131 rotatably mounted in the needle housing 138 by a pair of needle bearings 128, 129, the eccentric cam 131 having a cam surface 132 held in rolling contact with the ball 127. When the eccentric cam 131, which is of a symmetrical shape with respect to the vertical direction in FIG. 7, rotates, the ball 127 rotates clockwise or counterclockwise on a right-hand portion (as shown in FIG. 7) of the cam surface 132 and moves in the axial direction of the adjusting rod 126, thus axially displacing the adjusting rod 126. The eccentric cam 131 is functionally similar to the eccentric cam 48 according to the first embodiment described above.

Figure 8:
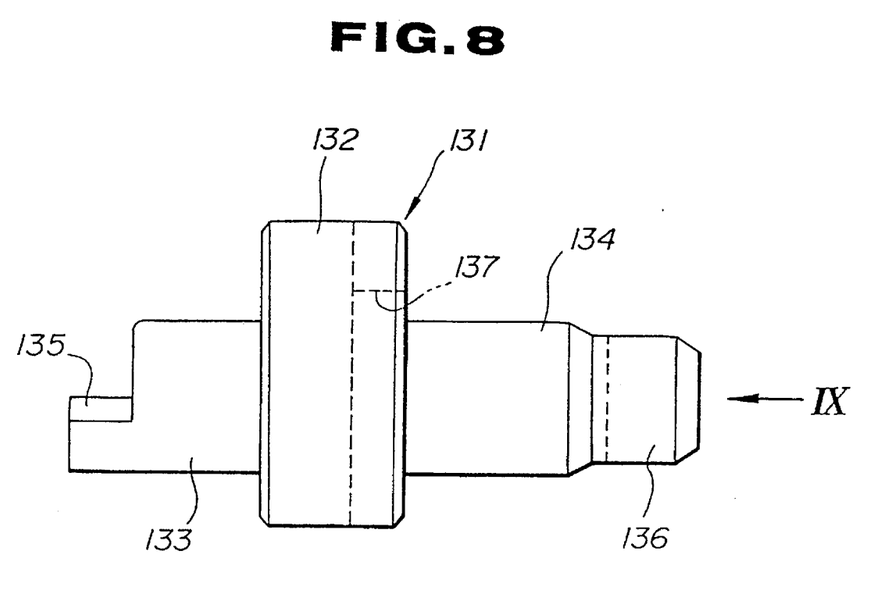
FIG. 8 is an enlarged front elevational view of an eccentric cam member of the damping force adjusting mechanism shown in FIG. 6.
Figure 9:
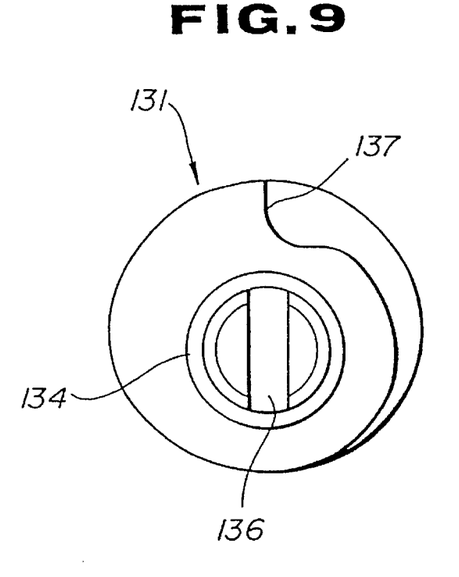
FIG. 9 is an end view of the eccentric cam member as viewed in the direction indicated by the arrow IX in FIG. 8.

As shown in FIGS. 8 and 9, the eccentric cam 131 has shafts 133, 134 extending in opposite directions. The shaft 133 has a cross-sectionally sectorial projection 135 (see FIG. 7) on an end face thereof, and the shaft 134 has a diametrical slot 136 defined in an end face thereof. The eccentric cam 131 also has a groove-shaped terminal step 137 defined in a peripheral edge portion of the right-hand end face thereof which faces the shaft 134.

As shown in FIGS. 6 and 7, a stopper bolt 141 is threaded in the housing 115 adjacent to the shaft 133, and has on its inner end an integral stopper 142 having engaged portions or surfaces 142a for engaging with an engaged surface 135a of the projection 135 of the eccentric cam 131 to limit an angular position of the eccentric cam 131 with respect to the ball 127. The stopper 142 may be set to a desired angle about its own axis and then fixing the stopper bolt 141 to the housing 115 with a lock nut 143. In the second embodiment, this limited angular position of the eccentric cam 131 as shown in FIG. 7(a) defines an extreme angular position or a minimum-damping-force angular position of an optimum-damping-force angular range. The opposite extreme ends of this optimum-damping-force angular range are defined by the stopper 142 for stopping the angular displacement of the eccentric cam 131 in a direction L as shown in FIG. 7(b) and a stopper pin 148, as described later on, for stopping the angular displacement of the eccentric cam 131 in a direction R as shown in FIG. 7(b). The eccentric cam 131 is normally placed within this optimum-damping-force angular range to control the damper assembly 101 to produce optimum damping forces. Thereupon, if the eccentric cam 131 is placed in the minimum-damping-force angular position by engagement between the stopper 142 and the projection 135, it controls the damper assembly 101 to produce minimum damping force, but yet optimum damping force.

The stopper 142 operates as follows: It is assumed that the stopper 142 is set to an angular position which is within the optimum-damping-force angular range for the eccentric cam 131 so as to control the damper assembly 101 to produce optimum damping forces as mentioned above. If a rotary actuator 146 such as an electric motor (described below) is brought into a free condition due to its own failure or a failure of its control system 160 (described below) when the eccentric cam 131 happens to be in an angular position in which it controls the damper assembly 101 to produce damping forces larger than the minimum damping forces, then the eccentric cam 131 tends to rotate counterclockwise in the direction indicated by the arrow L, as shown in FIG. 7(b), toward the minimum damping force angular Position and stops at the minimum-damping-force angular position which is conveniently within the optimum damping force angular range. That is, on such rotation of the eccentric cam 131, the eccentric cam 131 is engaged by the stopper 142 and prevented from being rotated in the direction L further from the minimum-damping-force angular position, as a result of which it still controls the damper assembly 101 to produce optimum-damping-force.

An actuator case 145 having an axis extending perpendicularly to the axis of the cylinder 102 is attached at its open left end to the housing 115. The rotary actuator 146 for rotating the eccentric cam 131 is housed in the actuator case 145. The rotary actuator 146 has a rotatable shaft 146a coupled to a joint piece 151 which is inserted in the slot 136 in the shaft 134 of the eccentric cam 131. The rotatable shaft 146a is coupled to the rotary actuator 146 through a speed reducer 149 composed of a train of gears.

The actuator case 145 also houses a potentiometer 147 for detecting the angular displacement of the eccentric cam 131 and hence the rotary actuator 146. The open left end of the housing 115 is closed by a lid 150 which has the stopper pin 148, as mentioned above, projecting toward the eccentric cam 131 for engaging the terminal step 137 to define one of the opposite extreme ends of the optimum-damping-force angular range and to limit the maximum angular displacement of the eccentric cam 131 in the direction indicated by the arrow R as shown in FIG. 7(c).

When the rotary actuator 146 is energized, the eccentric cam 131 is rotated to axially move the adjusting rod 126 for thereby varying the cross-sectional area of the bypass oil passage 125. Therefore, the damping forces generated by the piston 110 can be adjusted by the adjusting rod 126.

The stopper bolt 141 is fixed by the lock nut 143 after the stopper 142 is set to an angular position in which it engages the projection 135 of the eccentric cam 131 and which is defined within a frequently used angular range, i.e., within the optimum-damping-force angular range for urging the damper assembly 101 to produce optimum damping forces. The ball 127 held against the lower end of the adjusting rod 126 rolls on the right-hand portion (FIG. 7) of the cam surface 132 of the eccentric cam 131. The eccentric cam 131 can angularly move in the direction L from a maximum eccentricity position shown in FIG. 7(b) in which the damper assembly 101 generates maximum damping forces to the minimum-damping-force angular position in which the projection 135 of the eccentric cam 131 with the stopper 142 for the damper assembly 101 to the minimum-damping-force, but yet the optimum damping forces.

When the damper assembly 101 is required to produce damping forces greater than minimum damping forces which are produced by the eccentric cam 131 located in the minimum-damping-force angular position, the actuator 146 rotates the eccentric cam 131 clockwise in the direction indicated by the arrow R as shown in FIG. 7(b). At this time, the projection 135 is turned clockwise out of contact with the stopper 142. Now, a portion with greater eccentricity of the cam surface 132 is brought into contact with the ball 127, thus axially shifting the adjusting rod 126 to cause its end to reduce the cross-sectional area of the bypass oil passage 125. The eccentric cam 131 can be held in this position for the damper assembly 101 to produce greater damping forces by the control system 160 when it short-circuits the terminals of the rotary actuator 146 thereby braking the rotary actuator 146.

In the event of a failure of the rotary actuator 146 or the control system 160, the rotary actuator 146 is freed, allowing the eccentric cam 131 to be pushed by the adjusting rod 126 under the pressure of working oil in the damper assembly 101. The projection 135 of the eccentric cam 131 is turned counterclockwise in the direction L in FIG. 7 toward the position for the damper assembly 101 to produce minimum damping forces. However, since the projection 135 is engaged by the stopper 142 to stop the eccentric cam 131 in the minimum-damping-force angular position, the damping forces produced by the damper assembly 101 are prevented from becoming lower than optimum damping forces or the minimum-damping-force while the eccentric cam 131 is stopped thereat without departure from the optimum-damping-force angular range.

If the rotary actuator 146 operates normally, but the control system 160 fails and outputs an error signal to the rotary actuator 146, then the eccentric cam 131 may turn in the direction R toward and beyond the position for the damper assembly 101 to generate maximum damping forces. When a left-hand portion of the cam surface 132, which is not usually used for coaction with the ball 127, starts to engage the ball 127, the terminal step 137 of the eccentric cam 131 engages the stopper pin 147, thereby preventing the eccentric cam 131 from being turned further from a maximum angular position. Therefore, the damping force's produced by the damper assembly 101 are prevented from being unduly lowered because the maximum angular position is equivalent to one of the opposite extreme ends of the optimum-damping-force angular range for urging the damper assembly 101 to produce optimum-damping-forces.

As described above, the stopper 142 prevents the eccentric cam 131 from rotating in the event of a failure of the control system 160 or the actuator 146. Consequently, the damper assembly 101 does not produce inappropriate damping forces when the control system 160 or the actuator 146 fails. In particular, stopper 142 for defining the minimum-damping-force angular position is configured, as described above, to be adjustable in its own angular position for engaging with the engaging portion of the eccentric cam 131. Accordingly, it is possible to set a desired optimum-damping-force angular range for the eccentric cam 131 by changing the angular position of the stopper 142.

Furthermore, the stopper pin 148 can be set within the optimum-damping-force angular range for the eccentric cam 131 and defines the maximum angular position of the eccentric cam 131 by limiting the maximum angular displacement thereof. Even when an error signal is applied from the control system 160 to the actuator 146 to rotate the eccentric cam 131, the eccentric cam 131 is prevented by the stopper pin 148 from being unduly rotated because the maximum angular position is equivalent to one of the opposite extreme ends of the optimum-damping-force angular range for urging the damper assembly 101 to produce optimum damping forces.

In the second embodiment, the stopper 142, the projection 135 of the eccentric cam 131, and the terminal step 137 of the eccentric cam 131, and the stopper pin 148 jointly serve as a limiting means for limiting the angular movement of the eccentric cam 131. Such a limiting means may also be employed in the first embodiment by suitably modifying the eccentric cam 48 and associated components, so that the angular displacement of the eccentric cam 48 can be limited upon failure of the actuator 51 or the control system 60.

In the first embodiment, the needle rod 22 for adjusting the cross-sectional area or opening of the bypass oil passage 21 which bypasses the oil passage 11 is axially moved when the adjuster 22 is rotated. However, the damping force adjusting mechanism 170 according to the second embodiment may be incorporated in the first embodiment to adjust the cross-sectional area of the bypass oil passage 21. The damping force adjusting mechanism 37 housed in the tank attachment 32 which interconnects the damper assembly 1 and the auxiliary tank 31 according to the first embodiment may be housed in a joint member by which the damper assembly 101 and the auxiliary tank 180 are interconnected according to the second embodiment.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A hydraulic damper for use on a motor vehicle, comprising:

a damper assembly including a cylinder having an end joined to a body attachment adapted to be coupled to a vehicle body of the motor vehicle, and a rod extending in said cylinder and having on an end thereof a piston slidably held against an inner surface of said cylinder and defining at least a first oil chamber in the cylinder, said rod having an opposite end joined to an axle attachment adapted to be coupled to an axle of the motor vehicle;

an auxiliary tank defining a second oil chamber therein;

a joint member interconnecting said damper assembly and said auxiliary tank;

a communication mechanism including at least a communication passage defined in said joint mender and defining a communication oil passage which provides fluid communication between said first and second oil chambers;

a damping force adjusting mechanism coupled to said joint member for acting on working oil flowing through said communication oil passage between said first and second oil chambers to adjust damping forces of the hydraulic damper;

said damping force adjusting mechanism comprising:

an adjusting rod having an end disposed in said communication oil passage, said adjusting rod being movable toward and away from said communication oil passage to vary a cross-sectional area of said communication oil passage;

an eccentric cam rotatably disposed in engagement with an opposite end of said adjusting rod; and a rotary actuator for rotating said eccentric cam to move said adjusting rod toward and away from said communication oil passage to adjust the damping forces.

2. A hydraulic damper according to claim 1, wherein said damper assembly, said auxiliary tank, and said rotary actuator have respective axes lying parallel to each other.

3. A hydraulic damper according to claim 1, wherein said eccentric cam comprises a constant-velocity cam with a change in its eccentricity per unit angle of rotation thereof being constant.

4. A hydraulic damper according to claim 1, wherein said damping force adjusting mechanism further comprises:

a control system for controlling said rotary actuator; and limiting means for limiting rotation of said eccentric cam upon failure of at least one of said rotary actuator and said control system.

5. A hydraulic damper according to claim 4, wherein said limiting means comprises:

an engaging portion on said eccentric cam; and a stopper engageable with said engaging portion when the engaging portion rotates with said eccentric cam on rotation thereof toward an angular position for minimum damping forces, to stop said eccentric cam at a reference angular position for optimum damping forces.

6. A hydraulic damper according to claim 4, wherein said limiting means comprises:

a terminal step on said eccentric cam; and a stopper pin engageable with said terminal step when the terminal step rotates with said eccentric cam on rotation thereof beyond an angular position for maximum damping forces, to stop said eccentric cam at a maximum angular position.

* * * * *

UNITED STATES PATENT AND TRADEMARK OFFICE
CERTIFICATE OF CORRECTION

PATENT NO. : 5,597,054

DATED : January 28, 1997

INVENTOR(S) : Nagai, et al.

It is certified that error appears in the above-identified patent and that said Letters Patent is hereby corrected as shown below:

On the title page:

Item 75 [Inventors] "Sizouka" should read --Shizuoka--.

Column 2, Line 59 "ci" should read --a--.

Column 4, Line 13 "491" should read --49'--; Line 17 "331" should read --33'--; Line 66 "331" should read --33'--.

Column 5, Line 2 "331" should read --33'--; Line 14 "ma be" should read --may be--; Line 24 "491" should read --49'--.

Column 6, Line 24 "1.26" should read --126--.

Column 7, Line 27 "Position" should read --position--.

Column 10, Line 4 "mender" should read --member--.

Signed and Sealed this

Fourth Day of November, 1997

Attest:

BRUCE LEHMAN

*Attesting Officer*    *Commissioner of Patents and Trademarks*